US008285215B2

(12) United States Patent
Jones (aka Jabari)

(10) Patent No.: US 8,285,215 B2
(45) **Date of Patent: *Oct. 9, 2012**

(54) RADIO VISION ELECTRONIC NETWORK / ANALOG OUTPUT / VIEWING SYSTEM

(76) Inventor: Keith Jones (aka Jabari), Chicago, IL (US)

( * ) Notice: Subject to any disclaimer, the term of this patent is extended or adjusted under 35 U.S.C. 154(b) by 493 days.

This patent is subject to a terminal disclaimer.

(21) Appl. No.: 12/584,882

(22) Filed: Sep. 12, 2009

(65) Prior Publication Data

US 2010/0245676 A1 Sep. 30, 2010

(51) Int. Cl.
*H04B 1/00* (2006.01)

(52) U.S. Cl. ...... 455/42; 455/452.2; 455/3.06; 455/142; 455/3.01; 455/414.4; 348/14.01; 348/14.2; 348/473; 348/553; 348/555; 348/729; 348/725; 348/14.13; 348/608

(58) Field of Classification Search ............... 455/562.2, 455/3.06, 93, 353, 426.1, 131, 154.1, 556.1; 348/723, 729, 731, 515, 473

See application file for complete search history.

(56) References Cited

U.S. PATENT DOCUMENTS

| | | | | |
|---|---|---|---|---|
| 3,873,771 | A * | 3/1975 | Kleinerman et al. | 370/204 |
| 5,625,404 | A * | 4/1997 | Grady et al. | 725/114 |
| 6,249,642 | B1 * | 6/2001 | Lewis et al. | 386/213 |
| 6,374,112 | B1 * | 4/2002 | Widegren et al. | 455/452.2 |
| 7,813,451 | B2 * | 10/2010 | Binder et al. | 375/316 |

* cited by examiner

*Primary Examiner* — Matthew Anderson
*Assistant Examiner* — Ganiyu A Hanidu

(57) ABSTRACT

A system and method bringing video to commercial FM and video to Sub-Carrier Authorization programming, the system would make use of a Double Sideband Suppress Carrier SCA frequency at 67 kHz, modulated by a Slow San Video Converter for providing minute by minute snap shots of video related to the audio program on the main FM channel such as if the main FM channel being listened to is 87.5 MHz then the related video channel would be 87.567 MHz, also, an additional audio/slow scan video FM station would be available as well and will be known as fm2, the audio portion of fm2 is an Independent Sideband Suppressed Carrier for providing audio in stereo at the SCA frequency at 114 kHz the slow scan video portion of the station is again another Double Sideband Suppress Carrier SCA at the frequency of 92 kHz.

1 Claim, 6 Drawing Sheets

Dated: 02/01/2011

Figure 1:
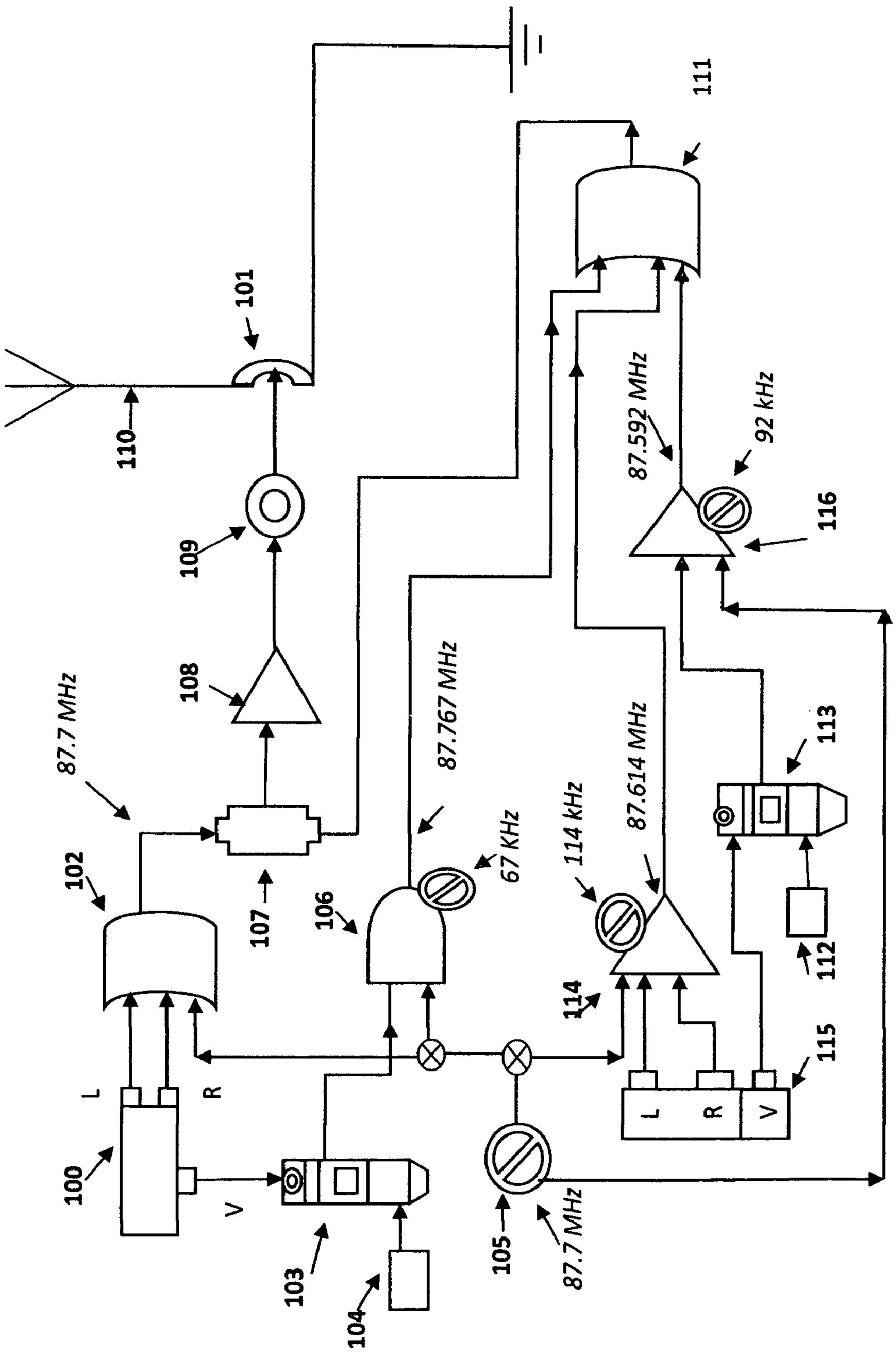
Figure 2:
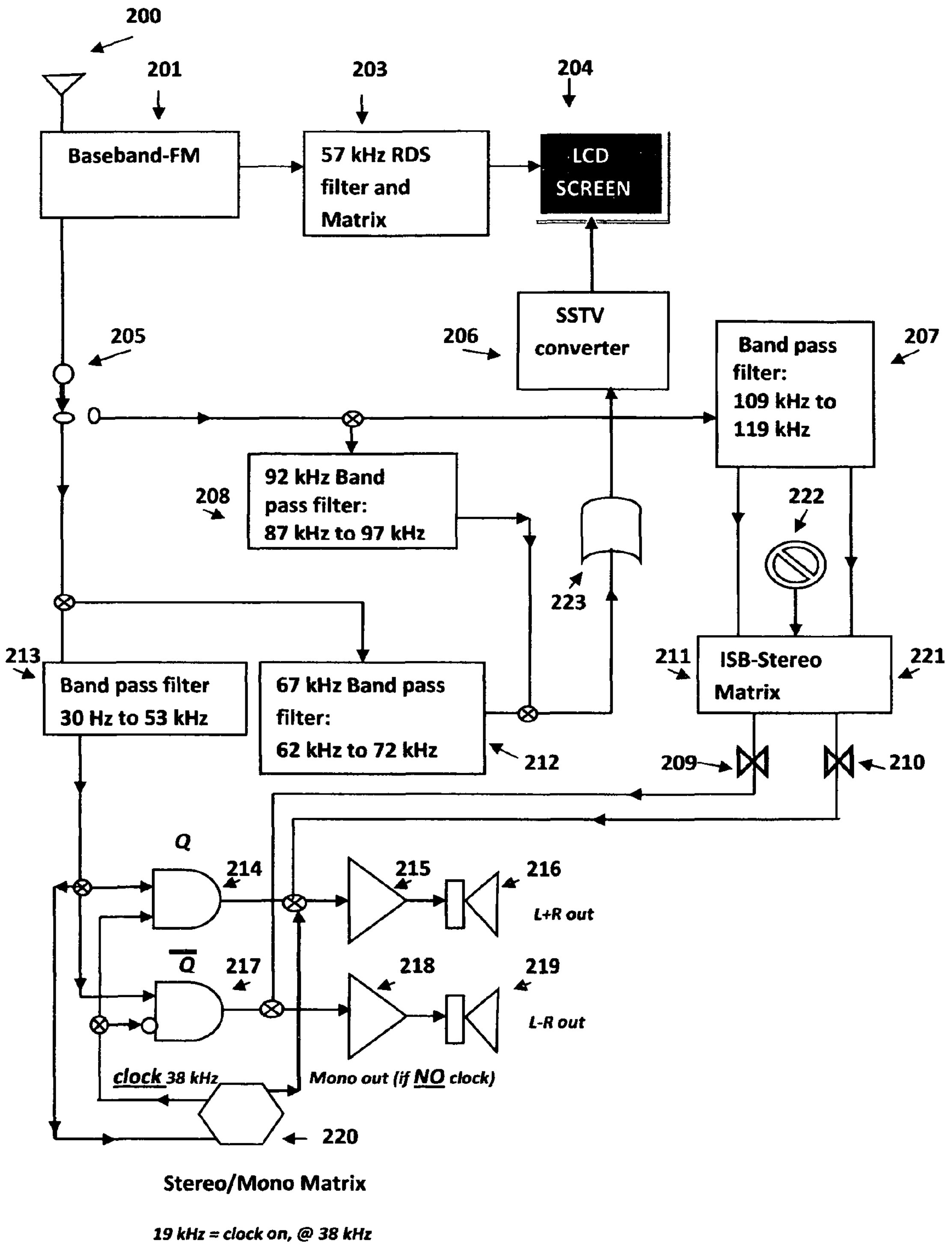
Figure 3:
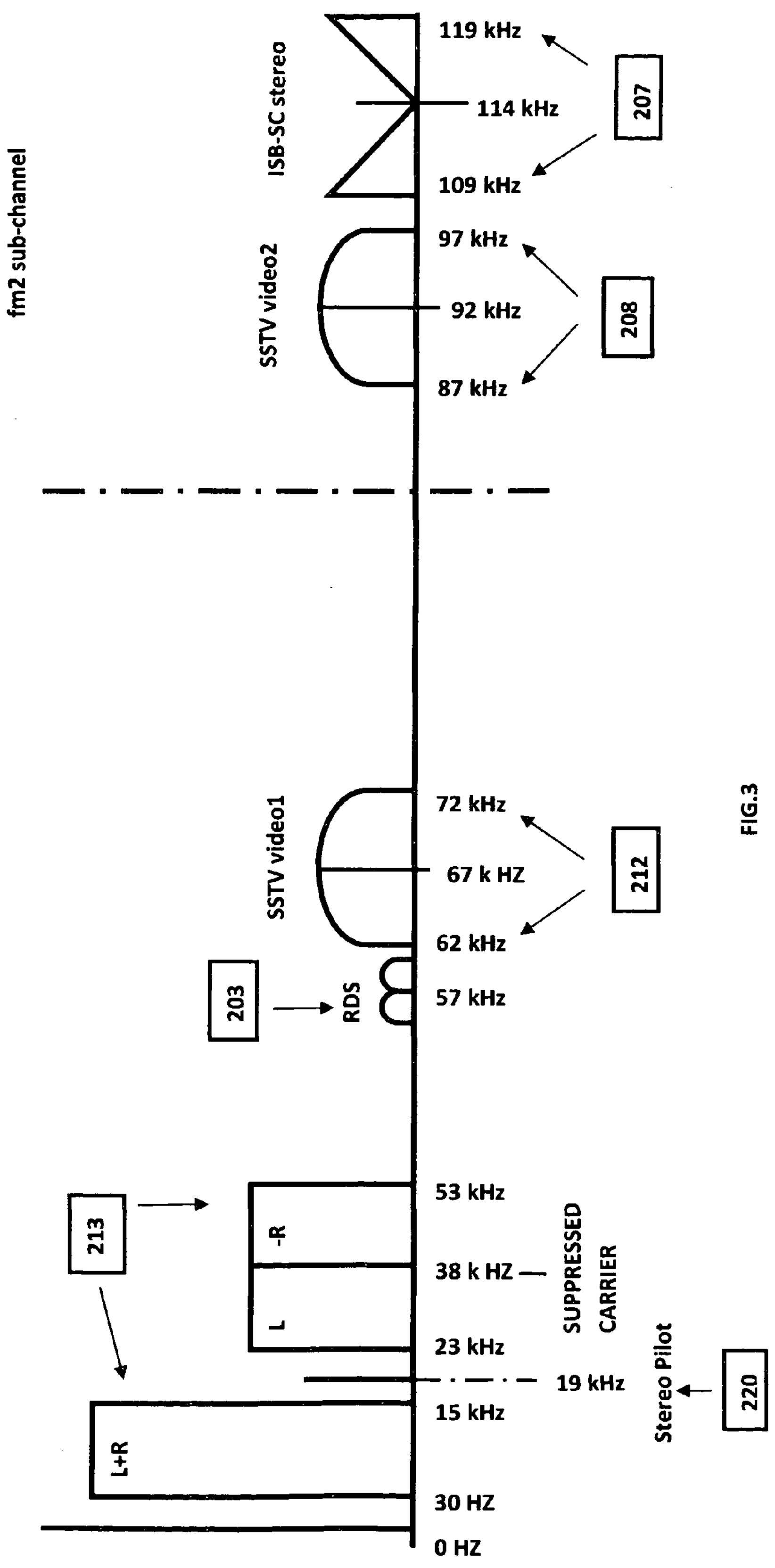
Figure 4:
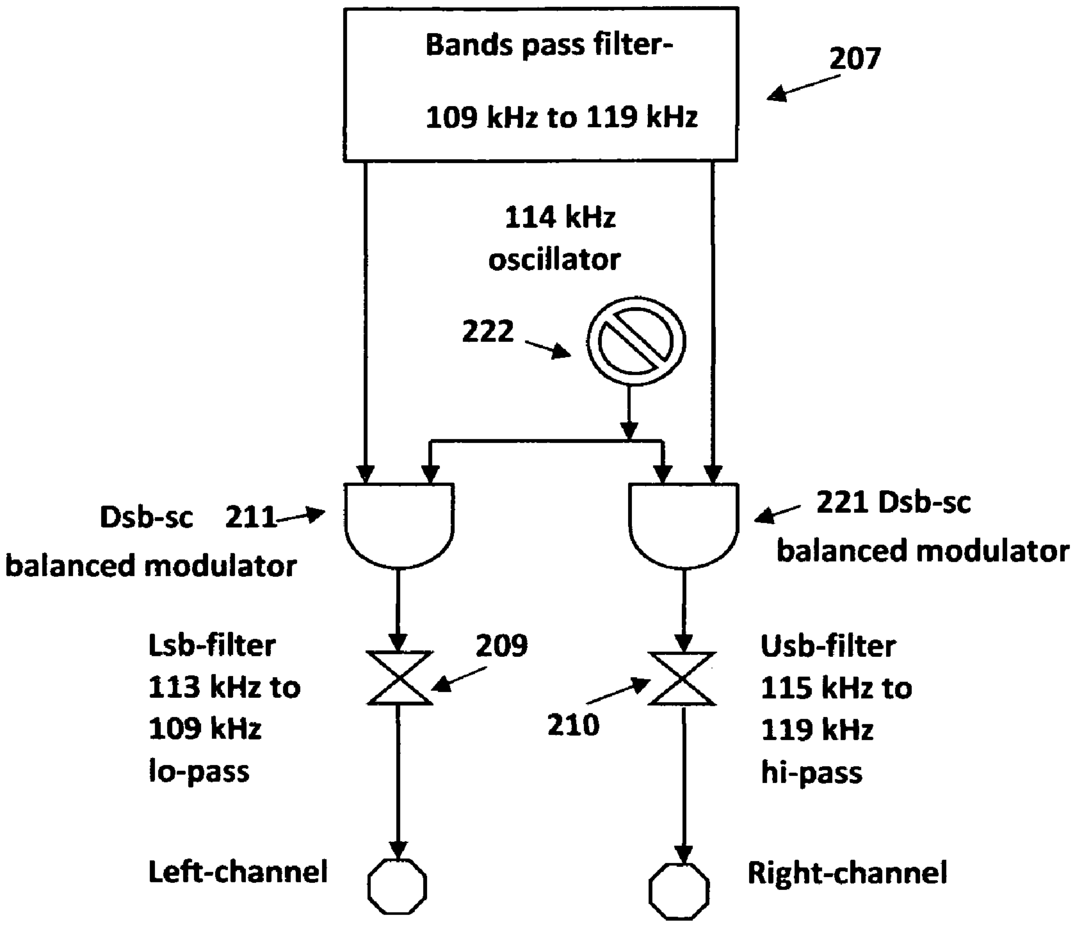
Figure 5:
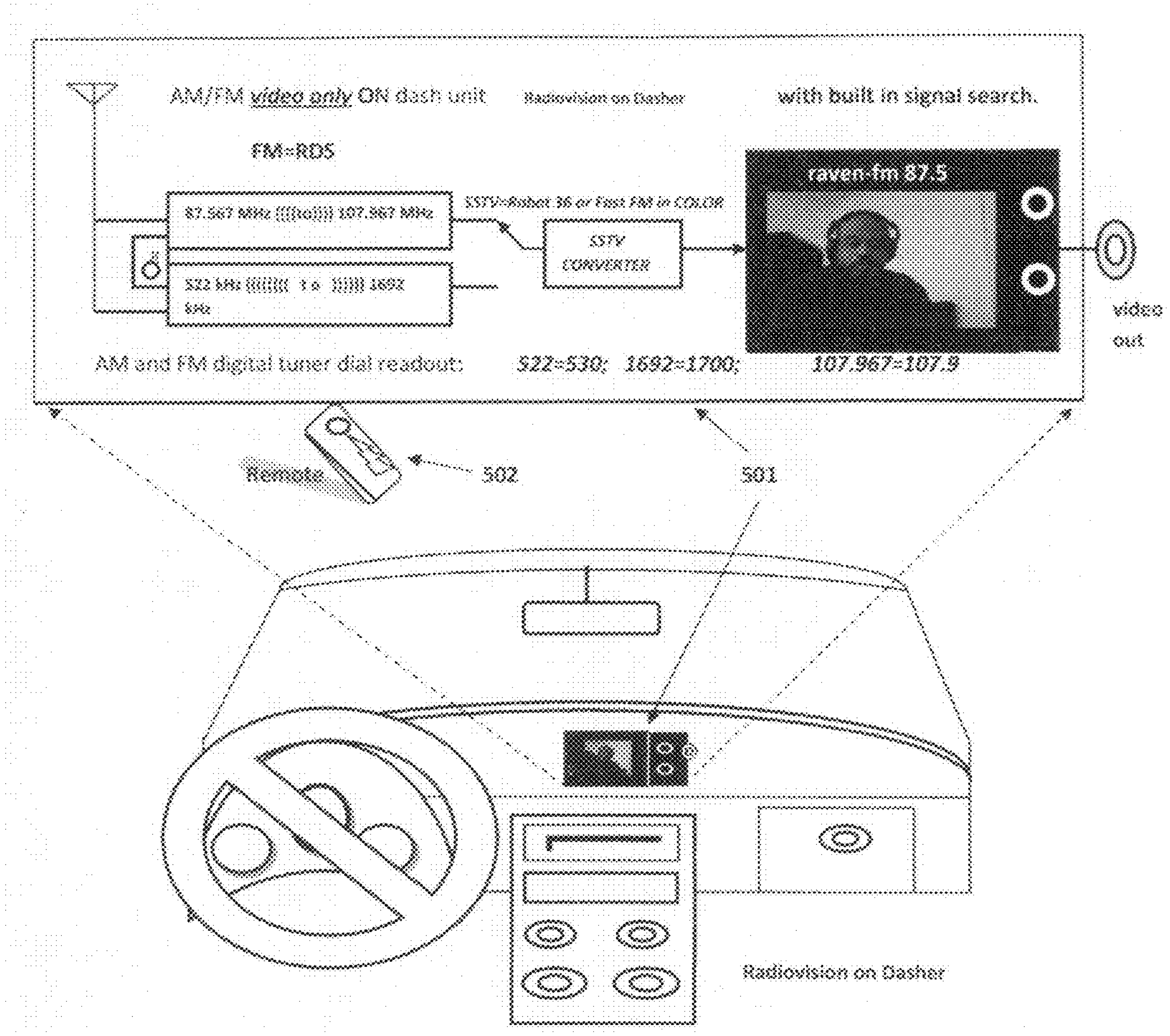
Figure 6:
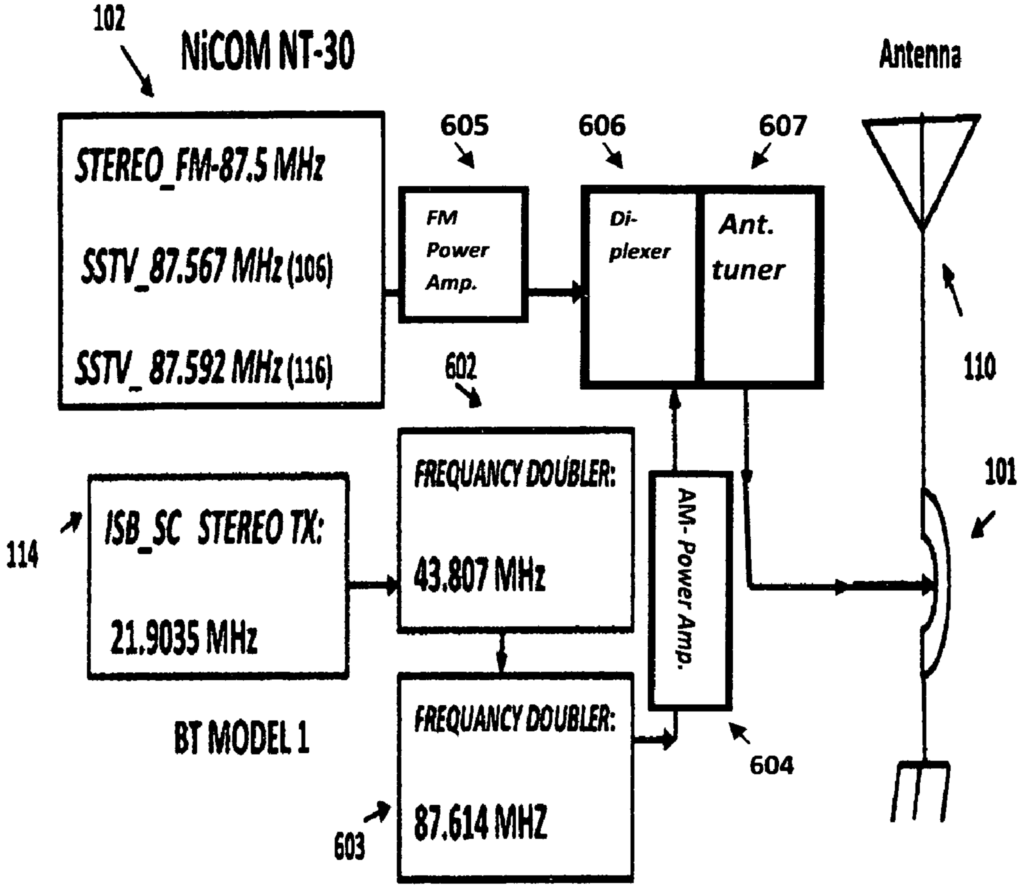

BT MODEL 1 frequency times 2 times 2 equals fm2 ISB-SC 114 KHz sub carrier Frequency Expl: 21.9035 MHz *2*2= 87.614 MHz Expl: 27.1535 MHz *2*2= 108.614 MHz

RADIO VISION ELECTRONIC NETWORK / ANALOG OUTPUT / VIEWING SYSTEM

A system and method to bring video to commercial FM and video to Subcarrier Authorization programming as well.

The system would make use of a Double Sideband Suppress Carrier SCA frequency at 67 kHz modulated by a Slow San Video Converter for providing minute by minute snap shots of video related to the audio program on the main FM channel such as if the main FM channel being listened to is 87.5 MHz then the related video channel would be 87.567 MHz In addition to that an additional audio/slow scan video FM station would be available as well and would be known as fm2. The audio portion of fm2 is an Independent Sideband Suppressed Carrier for providing audio in stereo at the SCA frequency at 114 kHz and the Slow Scan Video portion of the station is again another Double Sideband Suppress Carrier SCA at the frequency of 92 kHz, A Broadcast Technique MODEL 1 Independent Sideband Suppressed Carrier STEREO exciter and two frequency doublers, a power amp and a frequency multiplexer are used to obtain the 114 kHz sub carrier frequency By making the main FM radio station at 87.5 MHz thus causing the subcarrier fm2 radio station audio in stereo or not to be at 87.614 MHz and its Slow Scan Video portion at 87.592 MHz The Radiovision receiver will tune in each FM station's audio/video simultaneously with one button dial tuning and has a mode switch labeled FM/fm2 for separate listening and viewing of the two FM radio stations within the 200 kHz bandwidth per channel on the commercial FM band comprising of 87.5 MHz to 107.9 MHz The Broadcast equipment used for this project/invention were: A NiCom_NT-30 FM transmitter with left and right channel STEREO inputs, 67 kHz and 92 kHz INDEPENDENT SCA inputs.

Two Kenwood VC-H1 with auto switch.

Receiving equipment used for this project/invention were: A

RCA 2764 mini component set for receiving regulator FM stereo broadcast, a MetroSonix MS-3390 for receiving FM broadcast on the commercial FM band of 87.5 MHz to 107.9 MHz, as well as the video on the 67 kHz SCA and the 92 kHz SCA per FM channel, and the Kenwood VC-H1.

100_DVD player.
101_antenna input coil connector.
102_FM stereo/RDS transmitter.
103_color SSTV converter.
104_auto power switch
105__87.5 MHz main oscillator.
106__67 kHz subcarrier (dsb-sc video) modulator for main FM channel.
107_Diplexer.
108_RF Amplifier.
109_Antenna Tuner.
110_Antenna.
111_Subcarrier summing amp/mixer/frequency division multiplexer.
112_auto switch #2
113_fm2 color SSTV convertor.
114_fm2-114 kHz subcarrier (isb-sc audio) modulator.
115_DVD player.
116_fm2-92 kHz subcarrier (dsb-sc video) modulator.

200_Antenna.
201_FM receiver.
203_RDS matrix and band pass filter, 1.65 kHz wide (57 kHz to 58.65 kHz) for main FM channel.
204_LCD video screen.
205_FM/fm2 mode switch.
206_Slow Scan TV converter.
208__92 kHz band pass filter, 10 kHz wide (87 kHz to 97 kHz).
207__114 kHz band pass filter, 10 kHz wide (109 kHz to 119 kHz).
209_lower sideband low pass filter=left channel.
210_=upper sideband high pass filter right channel.
211_and 221_ISB-SC Stereo Matrix.
212__67 kHz band pass filter, 10 kHz wide (62 kHz to 72 kHz).
213__0 Hz to 53 kHz band pass filter.
214_Q and 217_not Q, =FM stereo detector.
215_Right channel audio amplifier.
216_Right channel output speaker.
218_Left channel audio amplifier.
219_Left channel output speaker.
220_Stereo sensor matrix and pilot light @ 19 kHz in 38 kHz out for main FM channel.
222__92 114 kHz oscillator for ISB-SC audio in stereo for fm2.
223_Double sidebands-suppressed carrier SCA demodulator for slow scan video.

A BRIEF DESCRIPTION OF THE DRAWING FIG. 1

Is the overall Radio Vision FM/fm2 stereo transmitter system, a signal source such as a microphone and a video camera, or in this case a DVD player (100) as the stereo audio signal source in the left and right channel input of the main channel of the test transmitter (102) operating on a frequency 87.5 MHz, The video source of the DVD player (100) is passed through a Slow Scan TV Converter (103), into the input of the 67 kHz SCA (106) portion of the test transmitter, the two signals are then passed through a diplexer (107), followed by the RF amplifier (108) and an antenna tuner (109) prior to being feed into the broadcast antenna (110).

In addition to that, the fm2 portion of the test transmitter makes use of two additional SCA's, the 114 kHz SCA (114) for the audio from the second DVD player (115) in use, as well it's video that passes through the second SSTV Converter (113), before reaching the 92 kHz SCA (116).

A BRIEF DESCRIPTION OF THE DRAWING FIG. 2

The video signal of fm2 passes through the 92 kHz filter (208) onto the video amplifier (223), SSTV converter (206) finalizing at the color LCD screen (204)

The audio portion of the fm2 signal passes though the 114 kHz filter (207) then continues on to an Independent Sideband system (211 and 221) to achieve stereo audio at the output speakers.

A BRIEF DESCRIPTION OF THE DRAWING FIG. 3

Comprising of the main fm channel L+R frequencies of 30 Hz to 15 kHz modulated at a 100% with plus or minus tolerances factored in and the L-R stereo frequencies of 23 kHz to 53 kHz at a modulation factor of 85% of the double sideband suppressed carrier (213)

Frequency location of the 19 kHz stereo pilot at 10% modulation (220)

The Radio Data Service (RDS) spectrum of 57 kHz at a modulation index of 05% (203)

The 67 kHz Subcarrier Authorization represents the location of the Slow Scan TV video1 for the main FM channel at no more than 10% modulation (212)

The 114 kHz Independent Sidebands Suppress Carrier SCA modulated as well at no more than 10%, is the audio in stereo for the fm2 sub channel (207)

And the 92 kHz SCA is the Slow Scan TV video2 for the fm2 sub channel also modulated at no more than 10% modulation (208)

A BRIEF DESCRIPTION OF THE DRAWING FIG. 4

Is the Independent Sideband system used to receive compatible stereo for the fm2 portion of the Radio Vision FM/fm2 stereo receivers.

Only the signals 109 kHz to 119 kHz will pass this band pass filter (207) into two double sideband suppressed carrier balanced modulators (211 and 221).

A Low Pass Filter (209) passes only frequencies; 114 kHz down to 109 kHz, for the left channel audio output, and a High Pass Filter (210) will pass frequencies; 114 kHz up to 119 kHz for the right channel audio output.

The phase lock loop circuit (222) sets the center frequency (suppressed carrier) for the ISB stereo detector at 114 kHz.

A BRIEF DESCRIPTION OF THE DRAWING FIG. 5

This unit the Radiovision on Dasher (501) is a video only device to be used in conjunction with any standard AM/FM receiver to track the video (album art) display being broadcast by radio stations using the RAVEN/RVS system, comprising of two tuners: one tuner, tunes to the FM sub carrier frequency of 67 KHz per FM channel of the broadcast stations heard in the United States, Canada, and Mexico, the other tuner; tunes 8 KHz to the left of each AM broadcast channel per AM station heard in the United States, Canada, and Mexico using the RAVEN/RVS system, the unit comprising of auto seek for radio stations using RAVEN/RVS system, two tuners for mentioned, as well as a LCD screen for viewing and a video out port for connecting an external monitor and a remote control (502) unit for hands free operation of the Radiovision on Dasher (501).

A BRIEF DESCRIPTION OF THE DRAWING FIG. 6

Is a block diagram for the fm2 broadcast setup, the main stereo transmitter (102) with its two internal video (SSTV) sub carriers (106) (116) at 67 kHz and 92 kHz above the main carrier, the Fm Transmitter signals (102) (106) (116) are coupled into the Fm Power Amplifier (605) then sent onward to the Diplexer (606) and Antenna Tuner (607) then to the FM broadcast antenna (110), at the same time an independent sidebands, transmitter in suppress carrier mode (114) is coupled into two series connected frequency doubles (602) (603) resulting in 114 kHz above the main carrier, then next into the AM Power amplifier (604) followed the Diplexer (606) and the Antenna tuner (607) before finally being sent out to the FM broadcast antenna (110).

The invention claimed is:

1. A system for broadcasting two separate strings of still life pictures on the commercial FM band, comprising: two Multi-media Object Transfer or Slow Scan TV devices connected one each into the inputs of the two separate subcarriers of an FM multiplexer transmitter, said FM multiplexer transmitter and all of its components are then connected in series to an RF amplifier referred to as the FM Power Amp, a diplexer and an antenna tuner, and finally into an antenna or antenna array, now with respect to said FM multiplexer transmitter, a second transmitter is coupled into said system as an additional subcarrier, the second transmitter is in series with frequency multipliers wherever needed to keep its emissions within the allowed bandwidth of the FM broadcasting station, an RF amplifier referred to as the AM Power Amp, and said diplexer is a high-low filter switch circuit that enables both transmitters to operate the same antenna at the same time and said antenna tuner completes the series, the second transmitter is an additional audio input source to pair with one of said still life video strings, the audio input of the FM multiplexer transmitter is paired to the remaining still life video string.

* * * * *